(12) United States Patent
Lambrecht et al.

(10) Patent No.: US 6,366,546 B1
(45) Date of Patent: Apr. 2, 2002

(54) OUTPUT DEVICE FOR DIGITALLY STORED DATA ON A DATA CARRIER

(75) Inventors: Armin Lambrecht, March; Wolfgang J. Riedel, Muelheim; Raimund Brunner, Denzlingen, all of (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/380,581

(22) PCT Filed: Mar. 4, 1998

(86) PCT No.: PCT/EP98/01220

§ 371 Date: Nov. 19, 1999

§ 102(e) Date: Nov. 19, 1999

(87) PCT Pub. No.: WO98/40845

PCT Pub. Date: Sep. 17, 1998

(30) Foreign Application Priority Data

Mar. 7, 1997 (DE) .......................... 197 09 305

(51) Int. Cl.⁷ .............................. G11B 5/09; G11B 7/00
(52) U.S. Cl. ............................. 369/59.21; 369/124.05; 369/47.32; 369/47.35
(58) Field of Search ................ 369/47.32–47.35, 369/59.21, 59.25, 59.26, 59.27, 124.06, 124.05, 124.12, 53.35, 53.36, 103, 59.17, 119, 44.17–44.21

(56) References Cited

U.S. PATENT DOCUMENTS

| | | | | |
|---|---|---|---|---|
| 5,343,451 A | * | 8/1994 | Iizuka | 369/32 |
| 5,508,990 A | * | 4/1996 | Nagasaki et al. | 369/124.02 |
| 5,818,805 A | * | 10/1998 | Kobayashi et al. | 369/47.32 |
| 6,111,831 A | * | 8/2000 | Alon et al. | 369/47.35 |

FOREIGN PATENT DOCUMENTS

| | | | |
|---|---|---|---|
| DE | 295 00 376.6 | | 4/1995 |
| DE | 196 25 396 A1 | * | 1/1997 |
| EP | 0 265 849 A2 | * | 5/1988 |
| EP | 0 278 760 A2 | * | 8/1988 |
| EP | 0 521 487 A1 | * | 1/1993 |
| EP | 0 602 581 A2 | * | 6/1994 |
| EP | 0 713 194 A1 | * | 5/1996 |
| EP | 0 773 511 A1 | * | 5/1997 |

* cited by examiner

Primary Examiner—Thang V. Tran
(74) Attorney, Agent, or Firm—Foley & Lardner

(57) ABSTRACT

An output device digitally stores data on a data carrier. The output device includes a reading unit, a data converter unit, and an output unit, provided with data reconstruction elements. Data to be reproduced can be processed by control data components contained in a start block. The control data components can be stored in a control data storage unit connected to the data reconstruction elements by way of a start block detector unit. This enables fast reproduction of large amounts of data, particularly digitized audio data.

6 Claims, 6 Drawing Sheets

OUTPUT DEVICE FOR DIGITALLY STORED DATA ON A DATA CARRIER

BACKGROUND OF THE INVENTION

A. Field of the Invention

The invention relates to an output apparatus for data, in particular audio data, digitally stored on a data carrier, comprising a reading unit for reading the data from the data carrier as analogue signals, further comprising a data converter unit for data processing and an output unit for the output of processed data.

B. Description of the Related Art

Such an apparatus is known from DE-U 295 00376. For the output of digitally stored data on a data carrier an optical reading unit for entering the data is provided for this device, having an optical reading head, which is to be passed over the data carrier as a so-called manual scanner. After processing the entered data in a data converter, a sound sequence can be reproduced as audio data, for example in a loudspeaker, serving as the output device.

Although the apparatus according to the generic clause is, in principle, functional, it appears to be in need of improvement in many respects for a high-quality reproduction of digitally stored data.

Another such apparatus is known from EP 0 773 511. For the output of digitally stored data on a data carrier an optical reading unit having an image sensor is provided for this device for entering the data. An initial processing is performed on the lowermost level 1 for an image of the image sensor, the first result being analysed for data blocks contained therein on level 2 thereabove. The second result is combined into macro blocks on level 3 thereabove, being subsequently combined in partial data files on level 4, which are then grouped into data files on level 5 and which are placed at the disposal of the overriding application.

This apparatus according to the generic clause as well is, in principle, functional. It is even possible to attain high-quality reproduction, if the process applied to the levels is appropriately designed. However, the apparatus requires a relatively long time from recording the images of the image sensor until the data output, for example as a sound sequence, due to the stepwise processing of the data contained in surface units, which is considered a drawback by a user of the apparatus. Moreover, the use of image sensors impairs an economical and dimensionally small realisation of a particularly high data density of data digitally stored on a data carrier.

SUMMARY OF THE INVENTION

It is therefore the object of the invention to particularly so further develop a device of the type set out in the opening paragraph that, in particular, in the event of high density of data to be reproduced a comparatively fast and, to a large extent, error-free data processing is brought about.

This object is attained by an apparatus according to the main claim while advantageous embodiments are set out in the subsidiary claims.

Due to the fact that a start block detector unit and a control data storage unit are provided, by means of which stored control data can be read and stored in a start block of the data carrier, subsequent data processing can be systematically controlled by preset parameters contained in the control data. According to the invention data reconstruction elements are provided for this purpose, which, supplied by associated control data influence the processing of the data to be reproduced in such a manner that even large amounts of data can be processed fast and without error.

In working examples, the control data storage unit as well as the data converter unit comprise as storage and output elements or as data reconstruction elements associated therewith in each case alternatively and/or cumulatively a binary threshold value indicator with an associated binary reconstruction element for the conversion into binary data of analogue signals according to a predetermined threshold value, further comprising a twist correction indicator, having a twist correction element associated therewith in order to compensate for a twisting of the data carrier deviating in relation to the desired direction, further comprising a grid size signal means with an associated texture reconstruction element for the reduction to a data set corresponding to the actual grid size of the data carrier, so that in the event of a coarser grid size of the data carrier in relation to the resolution capability of the reading unit entering processes are accelerated, further comprising a data format means with an associated data processing element for decompression or, respectively, decoding as well as for error correction with regard to a specific data format as well as comprising a level control value signalling means with an associated digital analogue converter for the correct output conversion into reproduction signals.

The reading unit is preferably designed for optically reading the data. For this purpose embodiments are provided, which include structural elements, pivotal or slidable in relation to a stationary data carrier, by means of which the data can preferably be read line by line.

BRIEF DESCRIPTION OF THE DRAWINGS

Further advantageous embodiments and advantages of the invention form the subject of the subsidiary claims as well as of the following description of working examples with reference to the figures of the drawing. There are shown in:

DETAILED DESCRIPTION OF THE PREFERRED EMBODIMENTS

Figure 1:
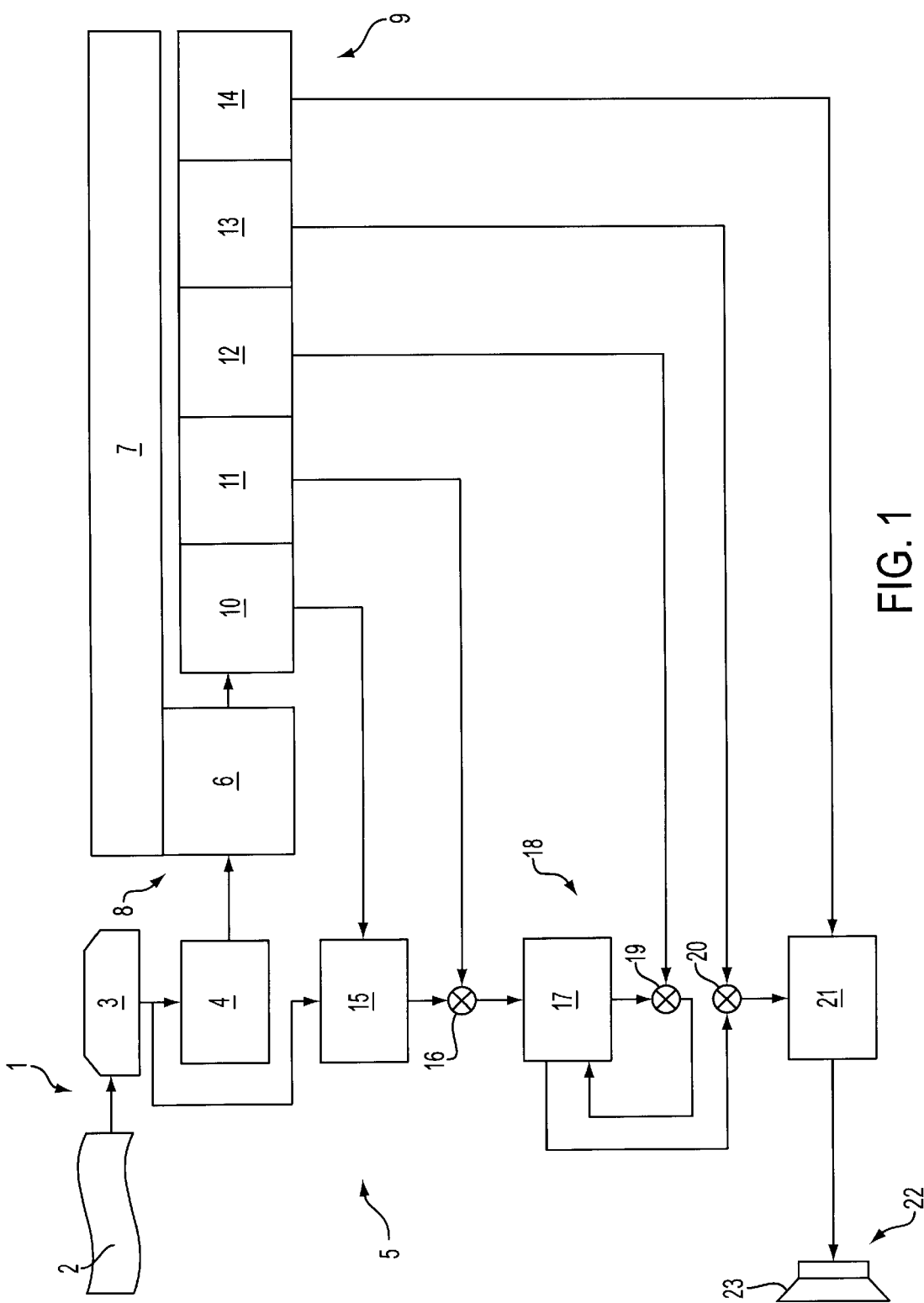
FIG. 1 in a block diagram, a first embodiment of an apparatus for the output of data, digitally stored on a data carrier, comprising two analogue/digital converters and a storage unit consisting of a multiple storage means, FIG. 2 in a block diagram, a second embodiment of an apparatus for the output of data, digitally stored on a data carrier, modified in relation to the apparatus according to FIG. 1 in that it comprises a storage unit with two storage means.

FIG. 1 shows a first embodiment of an apparatus for the output of digitally stored data on a data carrier in a block diagram. The apparatus according to FIG. 1 comprises a reading unit 1, comprising a sensor element 2 and a detection element 3, which communicates with the sensor element 2. Preferably, the sensor element 2 is an optical means by which a stationary data carrier comprising data, digitally stored in a light-dark-grid is adapted to be subjected to radiation, reflected radiation portions being adapted to be passed to the detection member 3, comprising an optical detector.

Preferably, a carrier with a black and white or a colour dot matrix applied by printing or photographically, is provided to serve as a data carrier for digital data, whereon, for example, a sound sequence is stored as audio data. The data are composed of a start block and a reproduction block, composed of individual data blocks, optionally closed by an end block. Furthermore, an orientation frame is provided, designed, for example, as a toothed frame. The reproduction data may in this context be compressed and/or encoded by a process known per se in the audio-technical field.

A start block analogue/digital converter (start block-ADW) 4 of a data converter unit 5 is connected to the detection member 3 of the reading unit 1, designed, for example, as an 8-bit-analogue/digital converter. By way of the start block-ADW 4, analogue signals, emitted by the detection member 3 of at least one start block contained on the data carrier as part of the digitally stored data and, in a particularly fast scanning process of the data carrier for the determination of a twist in relation to a desired direction, supplemented by the control data representing the twist, can be digitised and entered into a start block evaluation member 6 of a control unit 7, forming a start block detection unit 8. Control data, contained in and added to the start block of the data carrier can be read by means of the start block evaluation member 6 and are adapted to be entered into a control data storage unit 9, serving as storage and output members for control data components, comprising a grey stage threshold value signalling means 10, a twist correction signalling means 11, a grid size signalling means 12, a data formatting device 13 and a level control value signalling means 14.

A grey stage serving as a threshold value for a binary decision can be entered into the grey stage threshold signalling device 10, the analogue signal being adapted to be converted into a value of a binary signal, for example the zero signal, in the event of an analogue signal level below the threshold value and the said analogue signal being adapted to be converted into a value of the binary signal, for example the one-signal, in the event of an analogue signal level above the threshold value. The twist correction value signalling device 11 permits the storage of a twist correction value, representing an existing twist of the data carrier in relation to a desired direction, determined by the alignment of an orientation frame of the data carrier, formed, for example, by alignment data obtained during a fast scanning process of the data carrier from the position of a border means or when scanning the start block from orientation data derived from its orientation. The twist correction is preferably performed by a two-dimensional lazy-tongue means. A grid size value may be stored in the grid size signalling device 12, representing a grid size of the data carrier which corresponds to the spatial storage density. In the data formatting device 13 a data formatting value may be stored, representing a data format and an error correction process associated therewith of digitally stored data on the data carrier while useful level control values may be stored in the level control value device 14, in particular in the case of audio data to be acoustically reproduced, as data carriers comprising data for an acoustic reproduction.

The data converter unit 5 of the apparatus according to FIG. 1 is furthermore provided with a reproduction data analogue/digital converter (reproduction data-ADW) 15 serving as the data reconstruction element, designed, for example, as a fast 1-bit-analogue/digital converter. On the one hand, the reproduction-ADW 15 is connected directly to the detection member 3 and to the grey stage threshold value device 10 on the other, in which context at least analogue signals are adapted to be converted from digitally stored reproduction data on the data carrier of the data to binary data as a function of the threshold value stored in the binary threshold value device 10.

On the output side of the reproduction data-ADW 15 a twist correction member 16 is provided as a further data reconstruction element of the data converter unit 5, which is also connected to the twist correction value signalling device 11. The twist correction member 16 permits the correction towards the desired alignment of the binary data of the portions of the data to be emitted with regard to a twist deviating from the desired alignment of the data carrier and represented by the twist correction value.

The twist-corrected binary data are adapted to be entered into a multiple storage means 17 of a storage member 18 of the data converter unit 5. The common, multiple-usage, overwritable volatile multiple storage means 17 permits in the first instance to at least interstore a portion of the twist-corrected binary data and to enter them sequentially into a downstream texture reconstruction member 19 serving as a further data reconstruction element. The texture reconstruction member 19 is furthermore connected to the grid size signalling device 12, wherein the grid size value representing the grid size of the data carrier is stored. The binary data entered into the texture reconstruction member 19, forming a two-dimensional binary image of at least the reproduction data to be put out, are adapted to be reconstructed according to the grid size of the data carrier, omitting image information which is redundant for the reproduction data and are adapted to be stored again in the multiple storage means 17 by writing over already processed raw binary data. The reconstructed binary data in the multiple storage device 17 are adapted to be transferred, for example, by infra-red data transfer to an external unit for further use.

The binary data compressed in relation to the grid size are adapted to be emitted to a data processing member 20 serving as a further data reconstruction element of the data converter unit 5, connected, in addition, to the data formatting device 13. By means of the data processing member 20, the reproduction data to be read out, having a pre-set data format, are adapted to be decompressed or decoded for reproduction with error correction, for example, by checking the consistency according to the storage process used.

Onto the data processing member 20 follows an output-digital/analogue converter (output DAW) 21 serving as a further data reconstruction element, connected, in addition, to the level control value signalling device 14. The output-DAW 21 permits the conversion of the error-corrected, decompressed or decoded binary data in conjunction with the level control values from the level control value signalling device 14 into reproduction analogue output signals, adapted to be entered into an output unit 22. In the apparatus, elucidated by way of FIG. 1, the output unit 22 has a sound converter member 23, for example in the form of a loudspeaker for the reproduction of audio data, such as a sound sequence, stored on the data carrier.

The embodiment according to FIG. 1 is characterised by the fact that by the two-fold use of the multiple storage means 17 as well as the fast processing of the portions of the data comprising the reproduction data to be emitted by the fast reproduction data-ADW 15 a cost-effective solution is found with a data output involving a relatively short delay.

Figure 2:
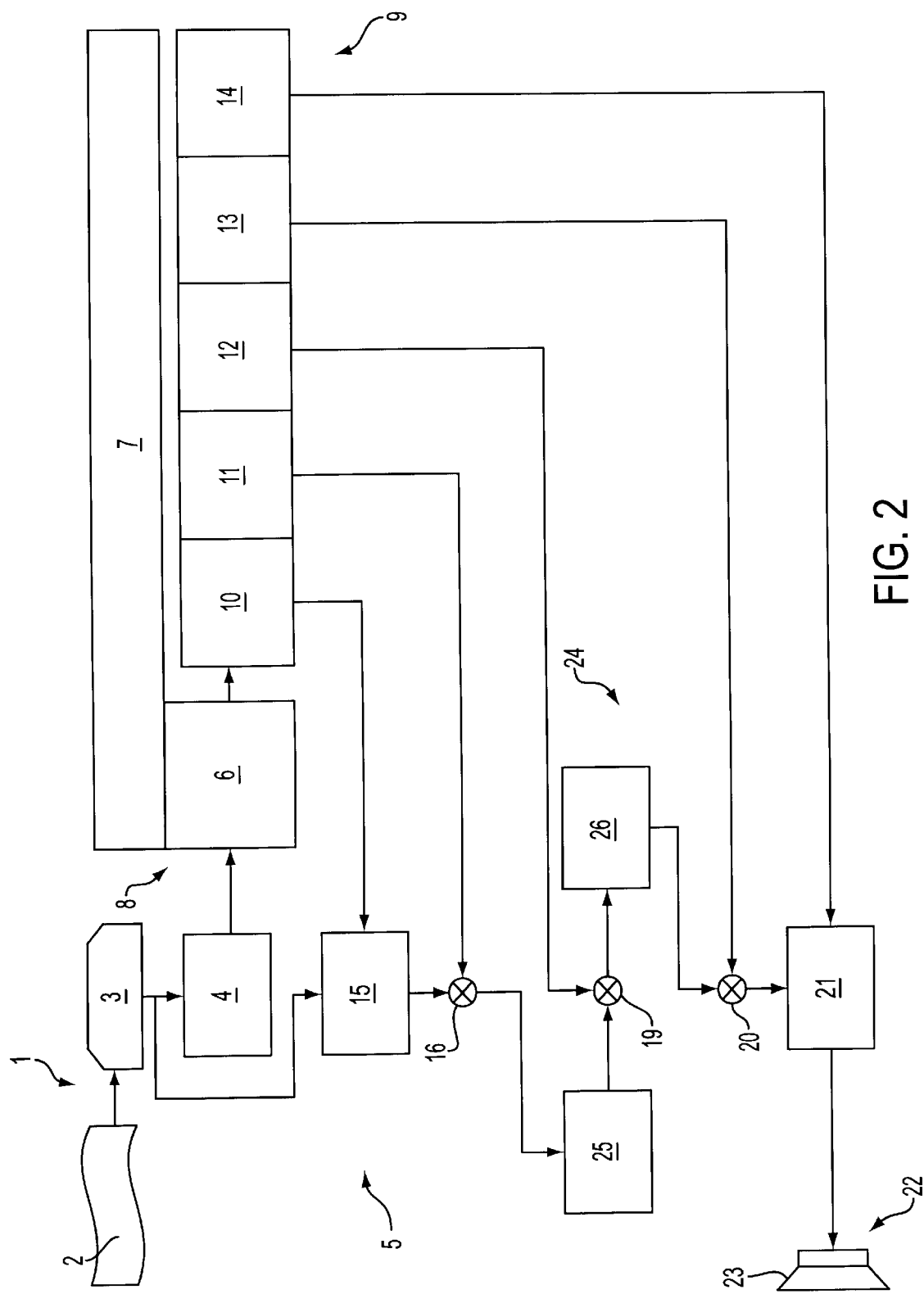

FIG. 2 shows a second embodiment of an apparatus for the output of digitally stored data on a data carrier as an adaptation of the embodiment elucidated in FIG. 1 in a block diagram, in which context corresponding structural elements in FIG. 1 and FIG. 2 are denoted by identical reference numbers and are not elucidated in detail in what follows. The data converter unit 5 of the embodiment according to FIG. 2 comprises a storage member 24, comprising a binary full image storage means 25, following on to the twist correction member 16, and a binary reproduction data storage means 26, following on to the texture reconstruction member 19. The twist-corrected binary reproduction data, digitised by the reproduction data-ADW 15, are adapted to be stored in the binary full image storage means 25 as a binary full image to the extent of the resolution of the scanning member 2. After the reduction to the grid size of the data carrier of the binary full image data of the binary full image storage means 25 by means of the grid size indicator 12 and the texture reconstruction member 19, the binary reproduction data with their full information content to be reproduced can be stored in the binary reproduction data storage means 26.

It is particularly advantageous to design the binary reproduction data storage means 26 in a non-volatile manner so that the data to be reproduced can, for example, be emitted more than once. In a further development the binary reproduction data storage means 26 is so dimensioned that storage of binary reproduction data from the data of a plurality of sequentially processed data carriers is possible. This permits the repeated output of, for example, longer sequences of audio data, adding up to a longer piece of music or the transfer to another medium, for example by infrared transmission.

Figure 3:
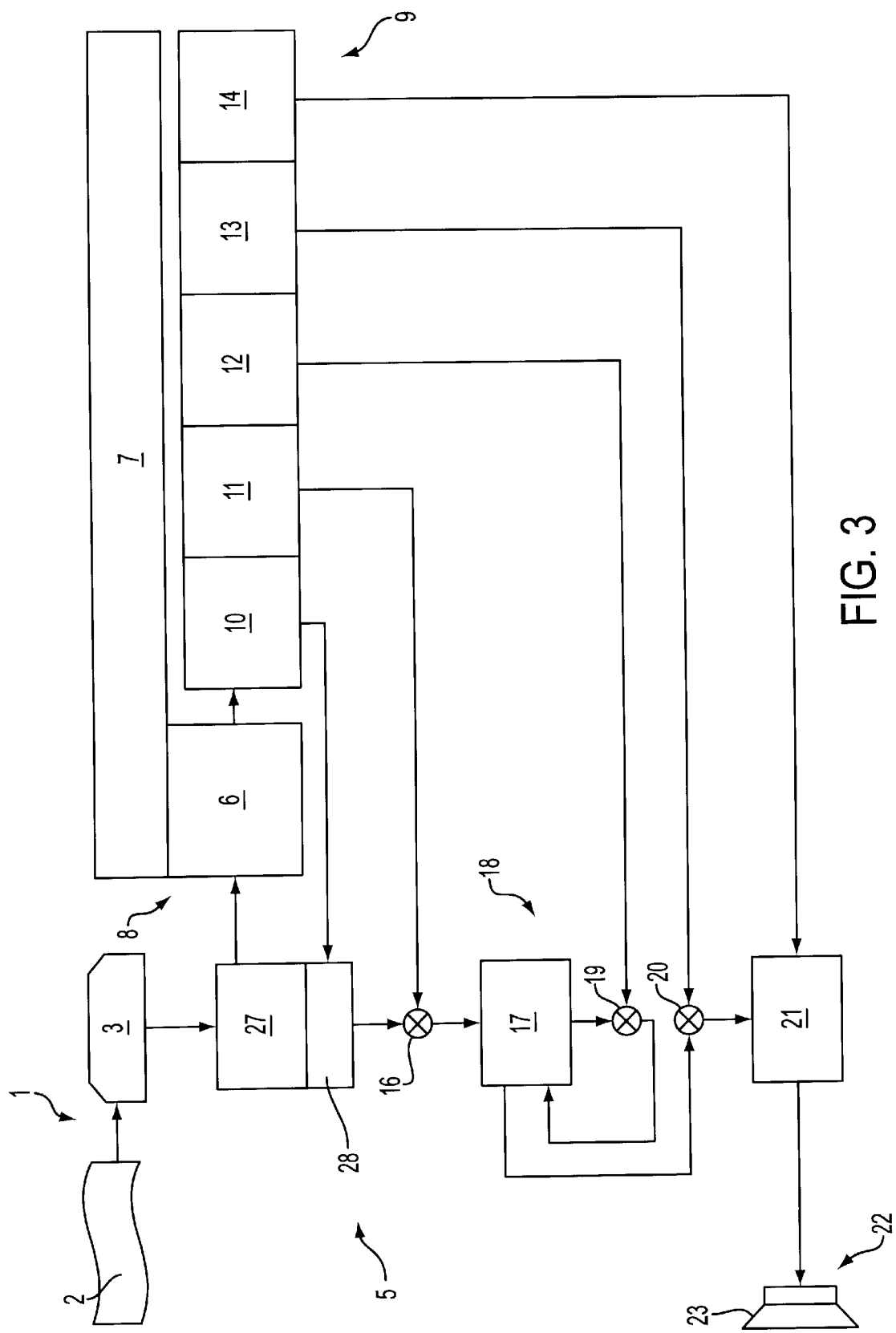
FIG. 3 in a block diagram, a third embodiment of an apparatus for the output of data, digitally stored on a data carrier, modified in relation to the apparatus according to FIG. 1 in that it comprises a single analogue/digital converter having a data reconstruction element at the output side.

FIG. 3 shows a third embodiment of an apparatus for the output of digitally stored data on a data carrier as an adaptation of the embodiment according to FIG. 1 in a block diagram, in which context identical structural elements in FIG. 1 and FIG. 3 are denoted by the same reference numbers and are not elucidated in detail further below. In the apparatus according to FIG. 3 the data converter unit 5 comprises a fast total data analogue/digital converter (total data-ADW) 27, positioned on the output side of the detection member 3, connected, on the one hand, to a start block evaluation member 6, onto which follows, on the other hand, a threshold value reconstruction member 28 serving as a data reconstruction element. Advantageously, the total data-ADW 27 is designed as a fast 8-bit-analogue/digital converter. The embodiment according to FIG. 3 makes provision to set down in a value chart the contrast and the determination of the threshold value, flexibly by a filter function. This attains contrast optimisation and reduction of entry errors. The embodiment according to FIG. 3 is characterised in a cost-effective manner by a very small number of modular elements of the data converter unit 5 while having a high flexibility with regard to the data reconstruction.

Figure 4:
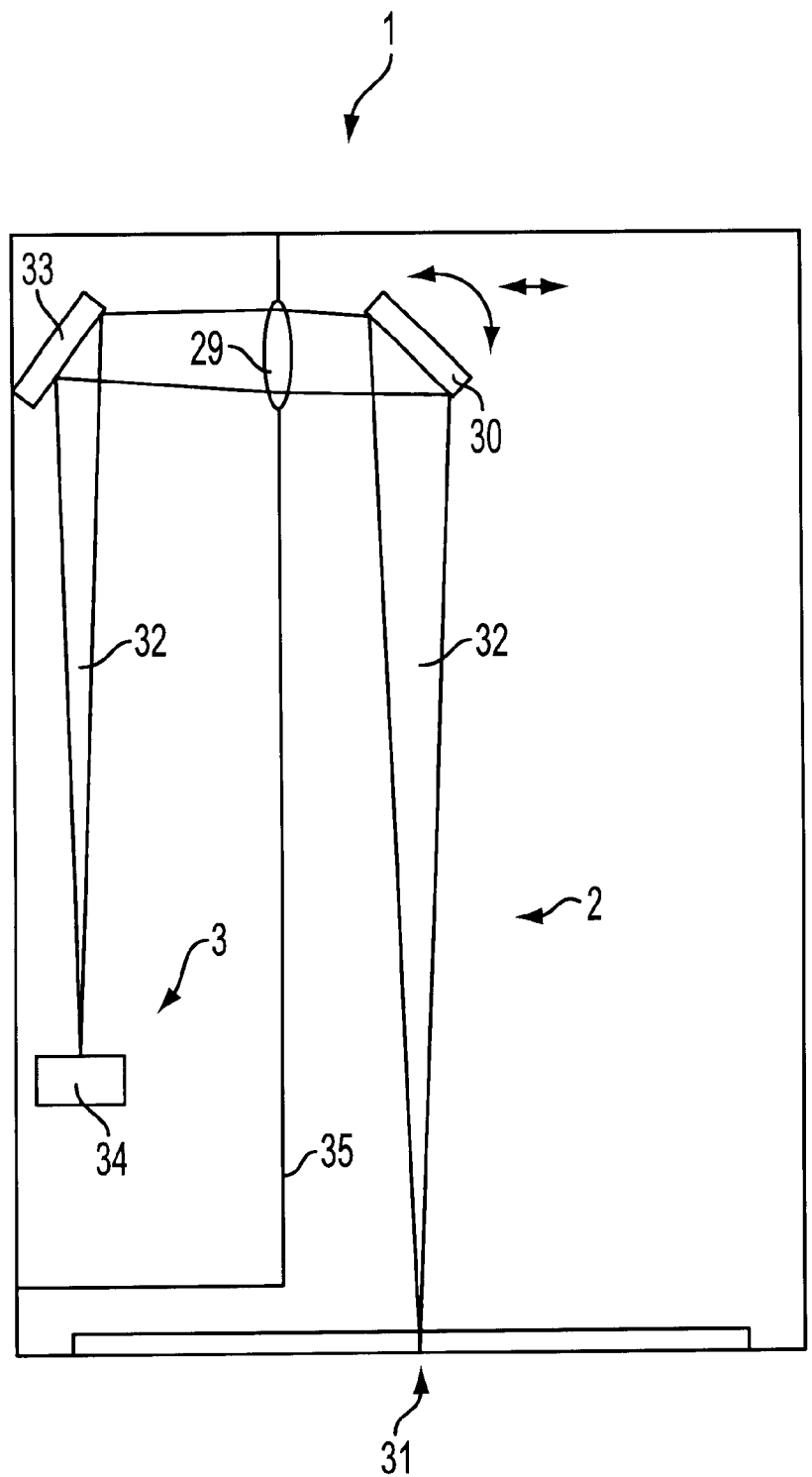
FIG. 4 an embodiment of an optical reading unit comprising a pivotal mirror for an apparatus for the output of data, digitally stored on a data carrier.

FIG. 4 shows an advantageous embodiment of an optically operating reading unit 1 for an apparatus for the output of digitally optically stored data on a stationary data carrier according to FIG. 1, FIG. 2 or FIG. 3, which can, however, in principle be used in conjunction with other data output devices as well. The reading unit 1 according to FIG. 4 is provided with an illuminating means, not shown in FIG. 4, by means of which a stationary data carrier is adapted to be subjected to optically readable data, digitally stored in a light-dark-dot matrix by illumination radiation. The scanning member 2 of the reading unit 1 according to FIG. 4 comprises reading optics 29, which by way of a pivotal and slidable aligning mirror 30 are adapted to be subjected to the reflected display radiation 32 reflected from a focusing region 31. By way of the reading optics 29 the display radiation 32 is adapted to be focused by way of a stationary mirror 33 onto the detection member 3. With the preferred line-by-line parallel or sequential scanning of the data carrier, the detection member 3 is designed as a line-by-line detector 34, preferably as the so-called charge-coupled-device (CCD) detector. For shielding against dispersion radiation the display radiation 32, beyond the reading optics 29, is guided inside a light-proof casing 35.

Figure 5:
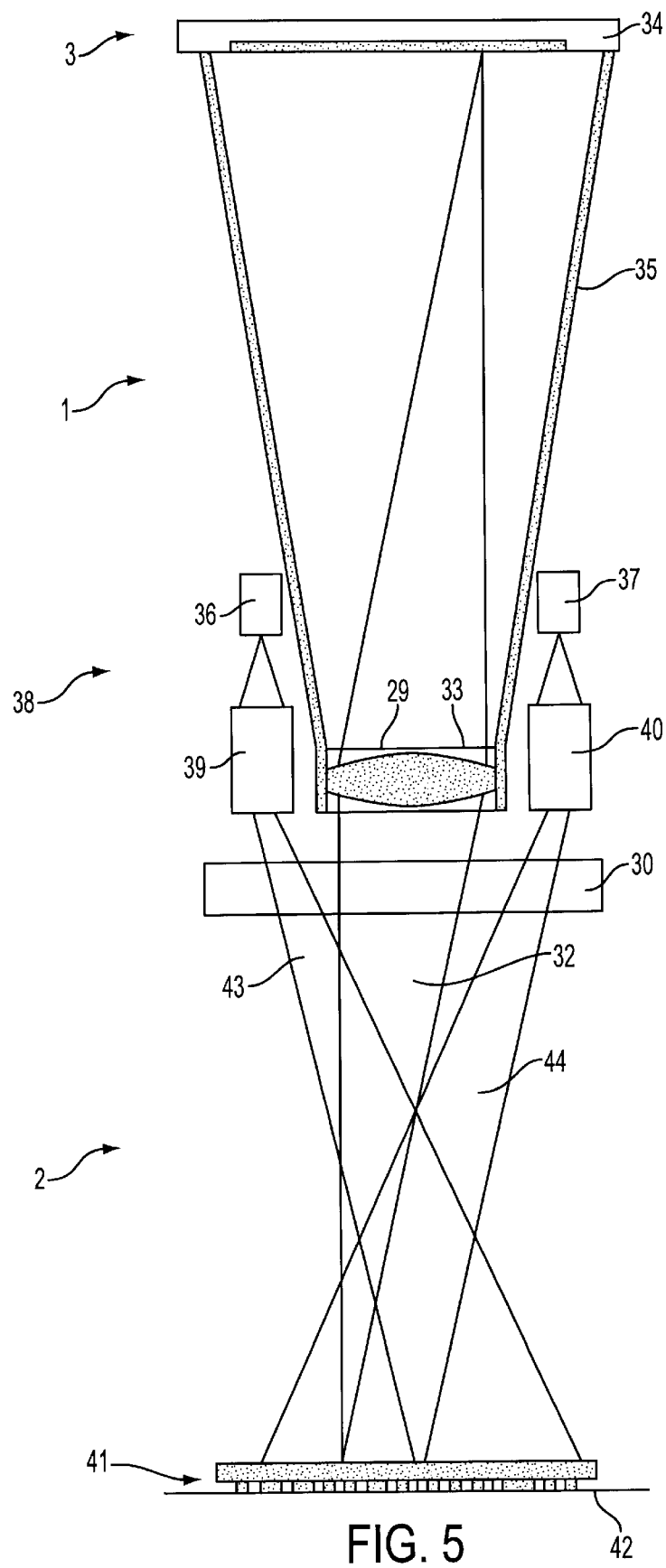
FIG. 5 the reading unit according to FIG. 4 in a side elevation.

FIG. 5 shows the reading unit 1 according to FIG. 4 in a side elevation, which, for the purpose of more clarity, has a beam pattern, offset by 180°, between the stationary mirror 33 and the line detector 34. On either side of the reading optics 29 light sources 36, 37 of an illumination means 38 are provided, associated illuminating optics 39, 40 being adapted to be subjected to their respective starting light. Diode lasers are preferably used to serve as light sources 36, 37. By way of two illuminating beams 43, 44 bordering on the surface of the data carrier 42, the illuminating optics 39, 40 are adapted to illuminate line-by-line in transverse direction a data carrier 42, placed onto a window 41 in the illustration according to FIG. 5, having a rectangular light-dark-grid, containing the data.

Figure 6:
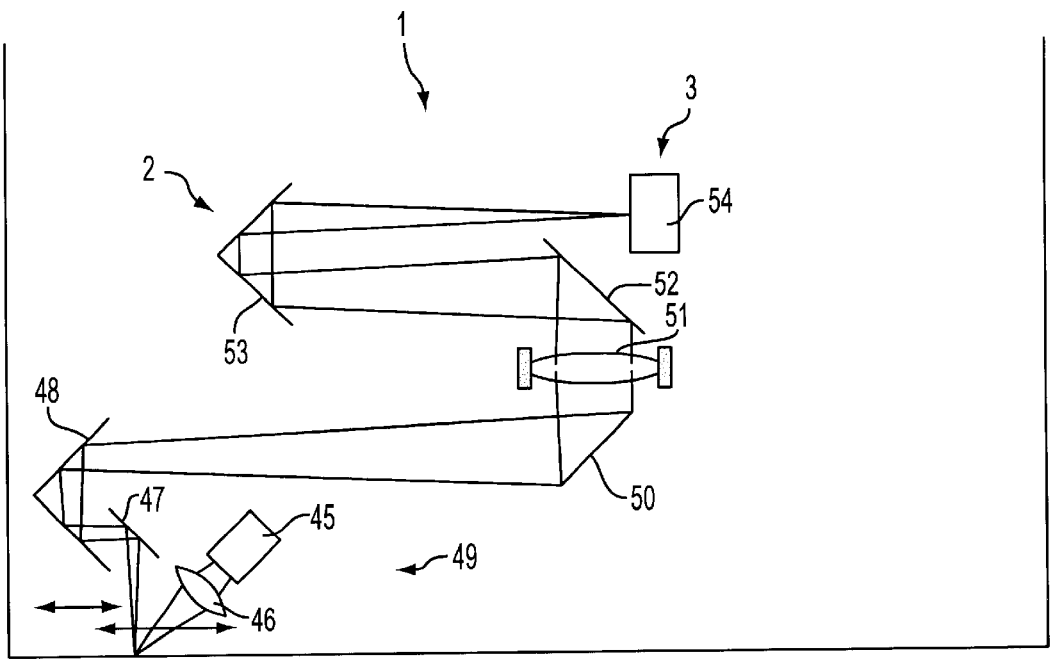
FIG. 6.

With the reading unit 1 according to FIG. 4 and FIG. 6, reading of the data is performed by way of the control unit 7 by successive line-by-line positioning of the illuminating beams 43, 44, pivoting the alignment mirror 30 line-by-line and reading the line detector 34.

Figure 7:
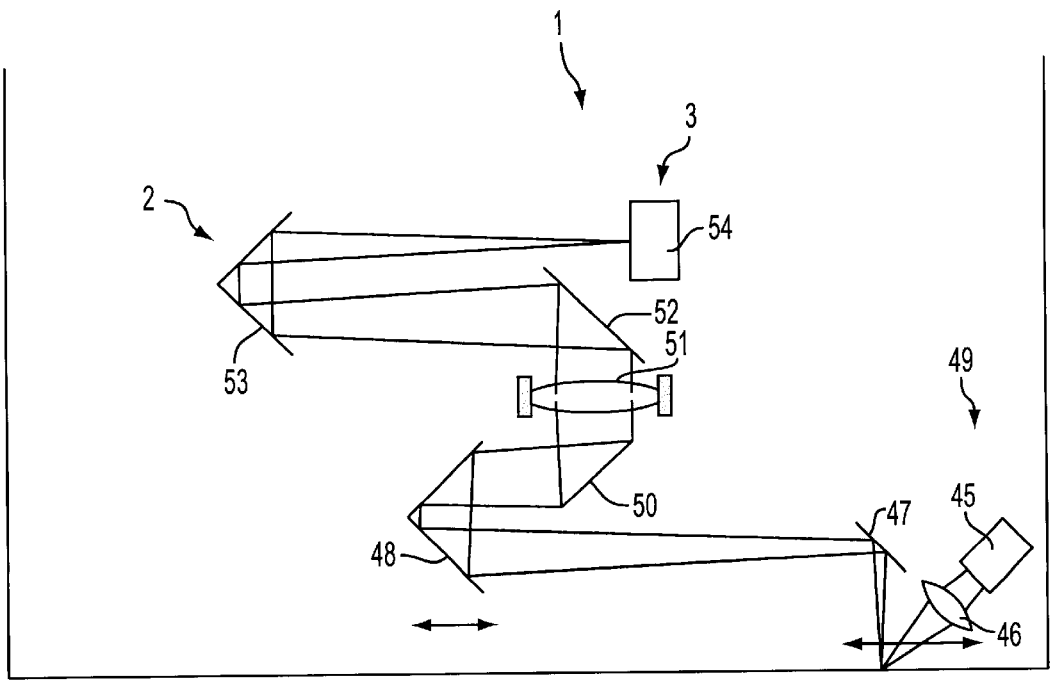
FIG. 7 a further embodiment of an optical reading unit with linear displacement optics in two marginal positions.

FIG. 6 and FIG. 7 show a further embodiment of an optically functioning reading unit 1 for use with an apparatus according to FIG. 1, FIG. 2 or FIG. 3 or even with a different data reading apparatus for reading a non-illustrated data carrier. The reading unit 1 according to FIG. 6 and FIG. 7 comprises a light source 45, taking the form, for example, of a light-emitting diode to serve as illuminating diode (LED), line focusing optics 46 being adapted to be subjected to its output radiation. The line focusing optics 46 permit to illuminate a data carrier, equipped, for example, with a rectangularly confined light-dark-grid for digital storage of data in transversely running lines.

The scanning member 2 of the reading unit 1 according to FIG. 6 and FIG. 7 further comprises a slidable mirror 47, positioned in spatially stationary relation to the light source 45 and the line focusing optics 46, deflecting by 90°, by means of which radiation portions reflected from the surface of the data carrier are adapted to be guided to a slidable deflecting unit 48, which deflects by 180° by parallel displacement, consisting, for example, of a prism or mirrors. The slidable deflecting unit 48 is coupled by way of a cable pull arrangement or a bar construction to the sliding element 49, formed by the light source 45, the line focusing optics 46 and the slidable mirror 47, in such a manner that the sliding path of the slidable deflecting unit 48 corresponds to half the sliding path of the sliding element 49.

The radiation portions adapted to be deflected by the slidable deflecting unit 48 are subjected to a first stationary deflecting mirror 50, deflecting by 90°, passing through reading optics 51 and adapted to be guided, where back and forth deflection is required, for reasons of space via a second stationary deflecting mirror 52, deflecting by 90° as well as via a stationary deflecting unit 53, deflecting by 180°, consisting, for example, of a prism or mirrors to a line detector 54 of the detection member 3, in which context the first stationary deflecting mirror 50, the reading optics 51, the second stationary deflecting mirror 52 as well as the stationary deflecting unit 53 are provided in a stationary manner in relation to one another. This ensures that a focal region transferred by the reading optics 51 to be displayed on the line detector 54 remains stationary when reading the data carrier, since, due to the displacement of the slidable deflecting unit 48 by half the path length of the slidable part 49, the whole optical path length remains unchanged during displacement between a first marginal position according to FIG. 6, while the optical path length between a data carrier and the line detector 51 remains unchanged between a second marginal position according to FIG. 7.

The reading unit 1 illustrated in FIG. 6 and FIG. 7 is characterised by very good economy of space and thus by a small size. Furthermore, due to the displacement of the light source 45 and the line focusing optics 46 over the entire data carrier, its uniform illumination in the direction of displacement is ensured, simplifying the data processing.

What is claimed is:

1. Output apparatus for data digitally stored in the form of a two-dimensional grid on a data carrier, comprising a reading unit (1) for reading the data from the data carrier as analogue signals, further comprising a data converter unit (5) for data processing and an output unit (22) for the output of processed data, characterised by the following features
   a) the reading unit (1) comprises a line detector (34), which successively enters the digital data line by line;
   b) the digital output data from the data converter unit (5) are transferred to a start block capturing unit (8);
   c) a control data storage unit (9) is connected to the start block capturing unit (8);
   d) the data converter unit (5) further comprises a playback data analogue/digital converter (WADW) (15), combined with a grey stage threshold signalling device (10) of the control data storage unit (9);
   e) a twist correction member (16) is connected to the WADW (15), which in turn is connected to a twist correction signalling device (11) of the control data storage unit (9);
   f) a storage member (18) of the twist converter unit (5) is connected to the output side of the twist correction member (16), and comprises a multiple storage means (17) as well as a texture reconstruction member (19), which coacts with a grid dimension signal emitter (12) of the control data storage unit (9);
   g) the binary data which are compressed in the storage member (18) in relation to the grid size are adapted to be entered into a data processing member (20), which is connected to a data formatting device (13) of the control data storage unit (9).

2. Apparatus according to claim 1, characterised in that for acoustic reproduction the data from the data processing member (20) are adapted to be transferred to an output digital/analogue converter (ADAW) (21), which is connected to a level control value signalling means (14) of the control data storage unit (9).

3. Apparatus according to claim 1, characterised in that between the texture reconstruction member (19) and the data processing member (20) a binary reproduction data storage means (26) is provided, which is capable of storing the complete information content to be reproduced of the binary reproduction data derived from the twist correction member (16).

4. Apparatus according to claim 3, characterised in that between the twist correction member (16) and the texture reconstruction member (19) a binary full image storage device (25) is provided.

5. Apparatus according to claim 1, characterised in that the reading unit (1) comprises reading optics, which by way of a pivotal and slidable aligning mirror is adapted to be subjected to the reflected display radiation (32) reflected form a focusing region (31).

6. Apparatus according to claim 5, characterised in that the display radiation (32) is adapted to be focused by way of a stationary mirror (33) onto a line detector (34).

* * * * *